(12) United States Patent
Eastman (10) Patent No.: US 7,877,631 B2
(45) Date of Patent: Jan. 25, 2011

(54) DETECTION OF SYSTEM BATTERY ERRORS

(75) Inventor: Darren Eastman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 442 days.

(21) Appl. No.: 11/969,725

(22) Filed: Jan. 4, 2008

(65) Prior Publication Data

US 2009/0177922 A1    Jul. 9, 2009

(51) Int. Cl.
*G06F 11/00* (2006.01)
(52) U.S. Cl. .......................................... 714/22; 714/47
(58) Field of Classification Search .................. 714/25, 714/14, 46, 47, 48
See application file for complete search history.

(56) References Cited

U.S. PATENT DOCUMENTS 6,160,873 A * 12/2000 Truong et al. .......... 379/102.02
2008/0270776 A1 * 10/2008 Totolos et al. .................. 713/1

OTHER PUBLICATIONS

IBM Technical Disclosure bulletin, Nov. 1986, US "Method for Warning Users of a low battery condition on a battery-powered computer", vol. 29, issue No. 6, cross reference:0018-8689-29-6-2641, pp. 2641-2643.*

IBM Technical Disclosure Bulletin, Mar. 1990, US, "Power-On Self-Test Extension Providing Remote Program Load Capability for Commumnication Cards", vol. 32, issue NO 10A, cross ref. 0018-8689-32-10A-288, pp. 288-292.*

"Toshiba Support Bulletins—Bad RTC Battery", [online]. [retrieved Dec. 14, 2007] Retrieved from the Internet: <http://www.csd.toshiba.com/>,(2007), 2 pgs.

* cited by examiner

*Primary Examiner*—Dieu-Minh Le
(74) *Attorney, Agent, or Firm*—Schwegman, Lundberg & Woessner, P.A.

(57) ABSTRACT

In an example embodiment, a method is provided to identify an error associated with a system battery. This system battery is operably associated with a computing device and is used to power the computing device. A parameter of the system battery is tested and an error associated with the system battery may be detected. In an example, the error may be detected before the operating system is loaded onto the computing device. In another example, the error may be detected when the computing device is waking from a reduced power mode.

29 Claims, 6 Drawing Sheets

DETECTION OF SYSTEM BATTERY ERRORS

FIELD

The present disclosure relates generally to computing devices. In an example embodiment, the disclosure relates to the detection of system battery errors in such computing devices.

BACKGROUND

Many types of processor-based computing devices ("computing devices") are known, for a seemingly endless range of functions, from those typically thought of as computing, to telephony, media storage and playback, etc. Many of these devices operate exclusively or optionally under battery-supplied power.

A computing device, such as a computer, typically performs a power-on self-test when the computer is initially turned on. In a power-on self-test, the computer may test the memory and the processor. If the tests reveal that there is a malfunction with either the memory or the processor, the computer may halt further boot operations.

In the case of computers, there are typically no tests done of the battery powering the computer (the "system battery"), during a system start or other return to operation state. In some systems, it has been known to perform a simplistic check of a small battery (typically, a coin, or "watch-type" battery) used to maintain minimal power to certain complementary metal-oxide-semiconductor (CMOS) circuits, such as, for example, a clock circuit used to maintain the system clock during at least some periods when the system is powered down. However, any testing or verification of the system battery has been deferred until boot of at least the operating system, and in some cases, additional software modules. Thus, with such systems, no evaluation of the system battery is facilitated unless the operating system, and possible such other modules, can be fully booted.

SUMMARY

The present invention provides for the detection of system battery errors in computing devices. Such a description is illustrative only, and those skilled in the art will recognize that the methods and processes of the embodiments described herein are not limited to use in a computing device.

Example embodiments provide various techniques for identifying an error associated with a system battery operably associated with a computing device and used to power the device. Here, at least one parameter of the system battery is tested, where the parameter is a state or a condition of the system battery. From the test, an error associated with the system battery may be detected. In some examples, multiple parameters are tested.

In an example, the error may be detected before the computing device loads the operating system. In another example, the error may be detected when the computing device is waking from a reduced power mode. After the error has been detected, the computing device may signal the error by, for example, by a visual indicator, such as actuating a light emitting device, and/or by an audible indicator, such as generating or presenting a sound.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1:
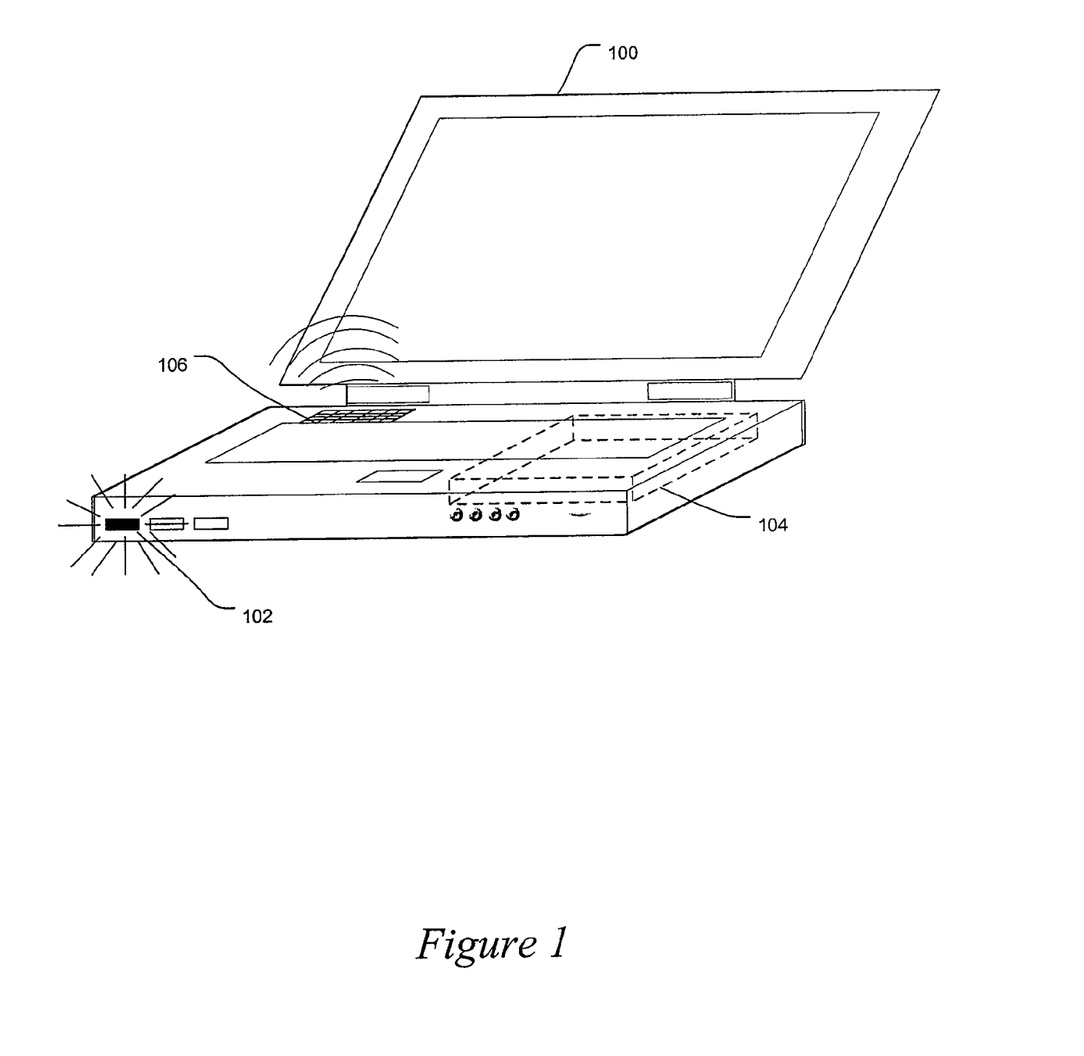
FIG. 1 depicts an example of a computing device having indicators that can be used to identify an error associated with a system battery that is operably associated with the computing device.

FIG. 1 depicts an example of computing device 100 having indicators that can be used to identify an error associated with a system battery that is operably associated with the computing device. As depicted, an example of computing device 100 is a portable computer. The computing device 100 includes system battery 104 that is used to power the computing device. In most cases, the system battery 104 can form a part of the computing device. For example, system battery 104 may be removably coupled to, or integrated within, computing device 100. However, it is conceivable that system battery 104 may be an external component. In some cases, the system battery 104 may malfunction or fail to function properly. There are a number of situations or conditions that may cause battery 104 to malfunction. For example, system battery 104 may not have a sufficient charge to power computing device 100 or may have a voltage imbalance.

As explained in more detail below, computing device 100 may be configured to detect an error associated with system battery 104 before an operating system is loaded onto the computing device. Additionally, in another example embodiment, the computing device 100 may be configured to detect an error when the computing device is waking from a reduced power mode. When an error associated with system battery 104 is detected, computing device 100 may signal the error with various visual and/or audio cues. In an example embodiment, as illustrated in FIG. 1, computing device 100 may signal the error visibly, such as by using a light, such as blinking light-emitting diode (LED) 102. In another example embodiment, computing device 100 may generate a sound through speaker 106, such as a series of beeps. With the visual and/or sound cues, a user of computing device 100 may quickly identify an error with system battery 104 without the computing device loading the operating system. Furthermore, for example, an error with system battery 104 may be identified without disassembling computing device 100 with an integrated system battery. Alternatively, as explained in more detail below, the user may also identify the error when the computing device is waking from a reduced power mode.

Figure 2:
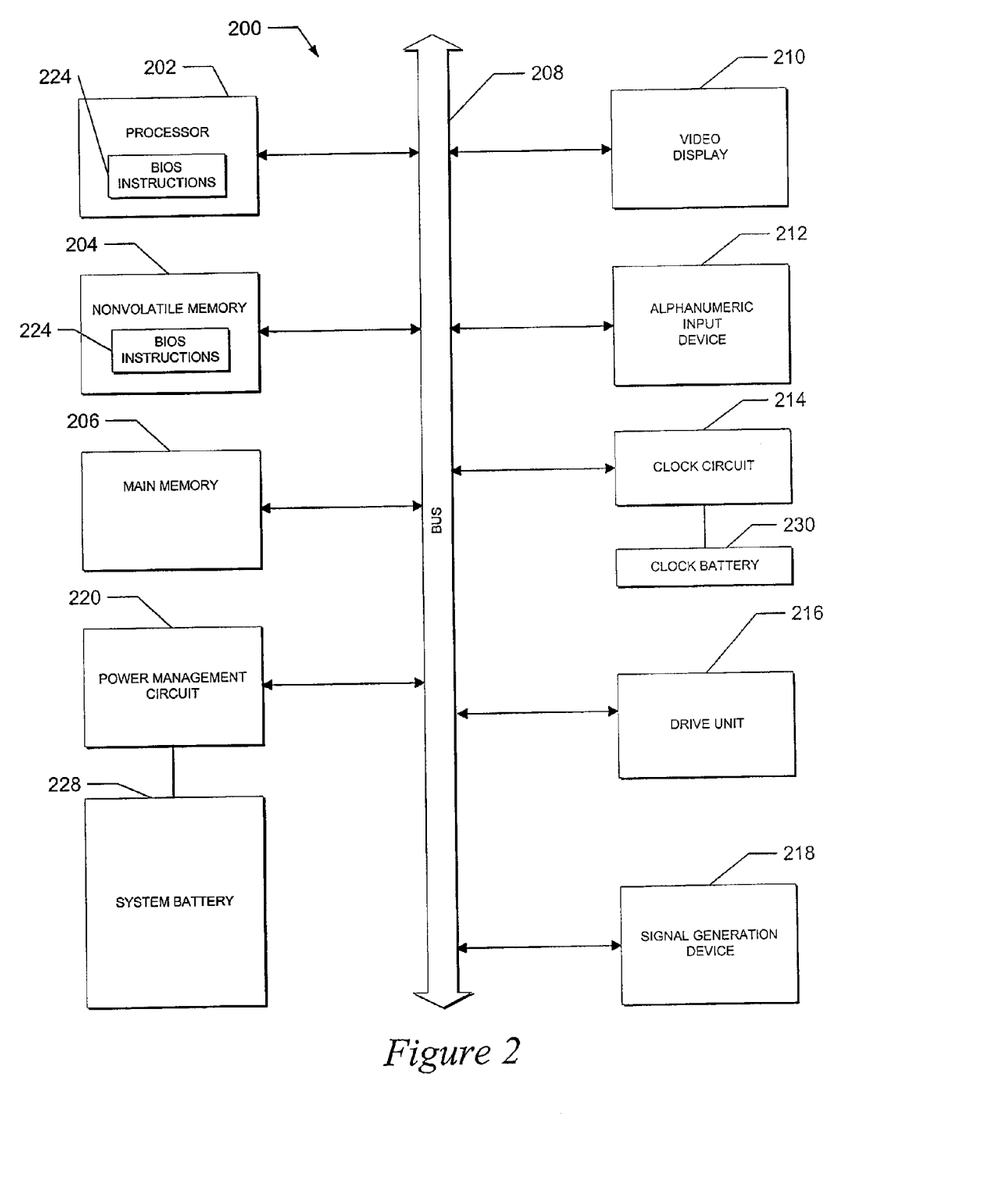
FIG. 2 depicts a diagrammatic representation of a computing device within which a set of instructions, for causing the machine to perform any of the functionality discussed herein, may be executed.

FIG. 2 depicts a diagrammatic representation of a computing device 200 within which a set of instructions, for causing the machine to perform any of the functionality discussed herein, may be executed. The computing device is a processor-based system, such as a computer (including any of a server computer, a desktop computer, a personal computer (PC), a portable or notebook computer, or a tablet computer), a set-top box (STB), a Personal Digital Assistant (PDA), a cellular telephone, a game console, or any machine having a processor capable of executing a set of instructions (sequential or otherwise) that specify actions to be taken by that device. Persons skilled in the art will recognize that many devices may be classifiable in more than one of the listed categories, and thus no exclusivity is intended by the identified categories. As an example, many processor-based systems having telephonic capability also have computing capabilities such that they may also be considered as computing devices.

The example computing device 200 includes at least one processor 202 (e.g., a central processing unit (CPU), a graphics processing unit (GPU), or both), nonvolatile memory 204 (e.g., mask read-only memory (ROM), erasable programmable ROM (EPROM), flash memory, or other nonvolatile memories), and main memory 206 (e.g., dynamic random access memory (DRAM) or static random access memory (SRAM)), which communicate with each other via bus 208. Computing device 200 may include one or more such processors 202, and each of the processors may have one or more processing cores. The computing device 200 may further include video display unit 210 (e.g., a liquid crystal display (LCD) or a cathode ray tube (CRT)), alphanumeric input device 212 (e.g., a keyboard), disk drive unit 216, signal generation device 218 (e.g., a speaker and/or a light emitting device), power management circuit 220, clock circuit 214, and clock battery 230.

System battery 228 also forms a part of computing device 200 and is operably associated with computing device 200. System battery 228 is configured to power the computing device by providing power (e.g., voltage and current) transmitted to components and circuitry within computing device 200. For example, system battery 228 may be a rechargeable lithium battery or a rechargeable nickel-cadmium battery that can power computing device 200 for a period of time when the computing device is not coupled to or connected to an additional power supply, such as an alternating current electrical power supply (e.g., through either an internal or external rectifying device). It should be noted that system battery 228 is distinct from clock battery 230. In general, clock battery 230 is used to power clock circuit 214, which is a computer clock that keeps track of time, and can also be used to power nonvolatile memory 204. Clock battery 230 is a small form-factor battery (such as a "coin" battery) with a single cell. Clock battery 230 may have a nominal voltage between 1.5 and 3 volts and does not have the capacity to completely power computing device 200. Furthermore, clock battery 230 may not be rechargeable.

When computing device 200 is turned on, cycled (turned off and on), or reset (e.g., reset signal sent to processor 202), the computing device initiates a pre-boot sequence. The pre-boot sequence is a hardware function that prepares computing device 200 such that an operating system or other software applications may be loaded onto the computing device. Basic Input/Output System (BIOS) instructions 224 may define the functions of the pre-boot sequence and are initiated (or loaded) before the operating system is loaded. In general, BIOS instructions 224 are the firmware code executed by computing device 200 during the pre-boot sequence. Examples of BIOS instructions 224 include Extensible Firmware Interface, Open Firmware, and LinuxBIOS. A pre-boot sequence may include operations such as initializing processor 202, main memory 206, and various input/output devices. Additionally, the pre-boot sequence may also include a self test. This self test may include verifying processor 202, verifying main memory 206, and identifying errors with system battery 228. As explained in more detail below, computing device 200 may also be configured to conduct a self test when the computing device detects a change in current supplied by system battery 228.

Nonvolatile memory 204 includes a machine-readable medium in which is stored one or more sets of BIOS instructions 224 embodying any one or more of the methodologies or functions described herein for self test operations, such as identifying errors with system battery 228. The BIOS instructions 224 may also reside, completely or at least partially, within main memory 206 and/or within processor 202 during execution thereof by computing device 200, and thus the main memory and the processor may also constitute machine-readable media. It should be appreciated that the described embodiments may be provided as a computing machine program product, or software, that may include a machine-readable medium having stored thereon instructions, which may be used to program a processing computing device to perform a process according to embodiments of the invention, whether presently described or not, since every conceivable variation is not enumerated herein. A machine-readable medium includes any mechanism for storing, permanently or temporarily, information in a form (e.g., software, processing application) readable by a machine. The machine-readable medium may include, but is not limited to, magnetic storage medium (e.g., floppy diskette); optical storage medium (e.g., CD-ROM); magneto-optical storage medium; ROM; random access memory (RAM); erasable programmable memory (e.g., EPROM and EEPROM); flash memory; or other types of medium suitable for storing electronic instructions. During operation of such a computing device, the instructions themselves exist, not only on machine-readable media, but may be embodied in an electrical, optical, acoustical or other form of propagated signals (e.g., carrier waves, infrared signals, digital signals, etc.) or conveyed through wireline, wireless, or other communications medium.

Figure 3:
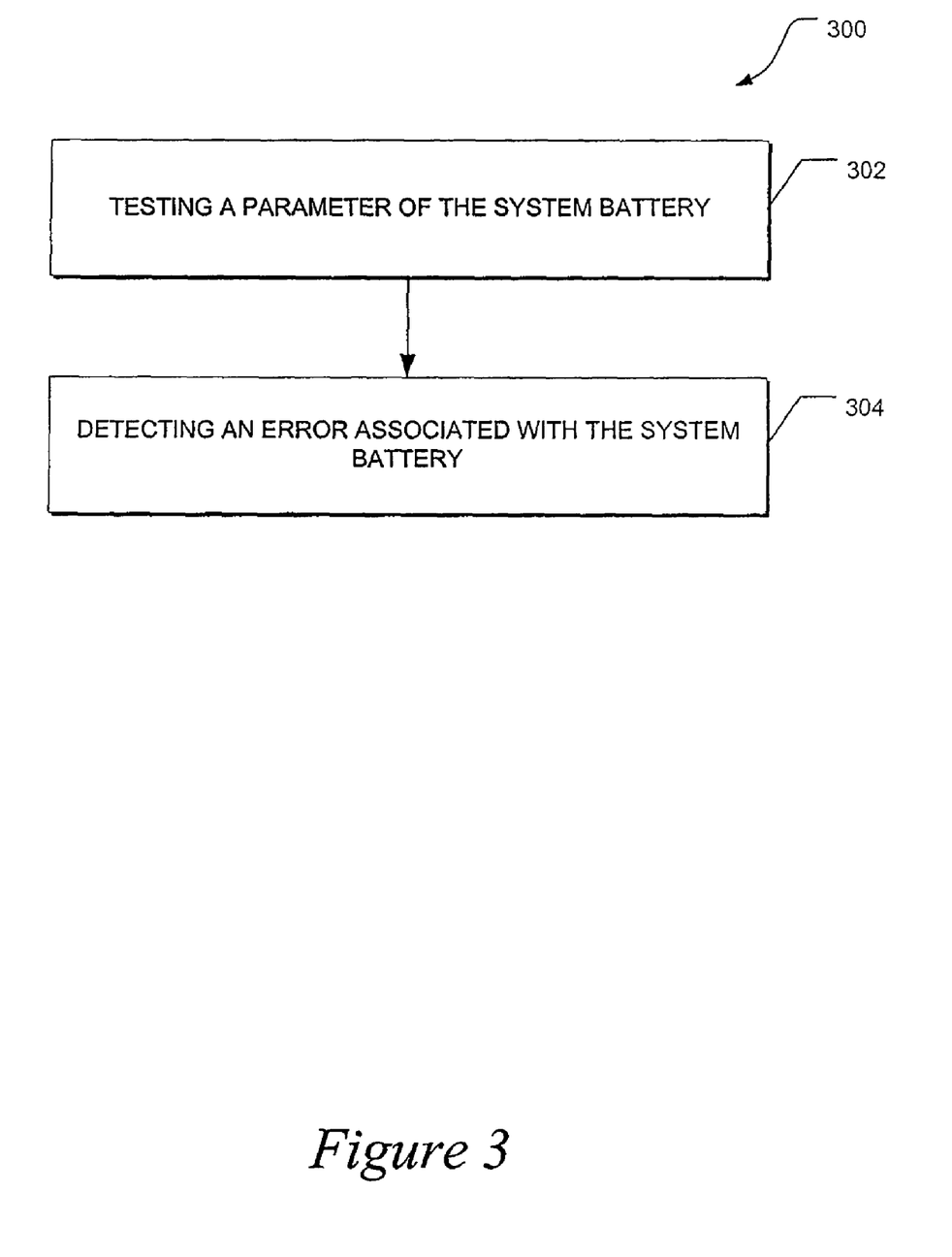
FIG. 3 depicts a flow diagram of a general overview of a method, in accordance with an example embodiment, for identifying an error associated with a system battery.

FIG. 3 depicts a flow diagram of a general overview of method 300, in accordance with an example embodiment, for identifying an error associated with a system battery. In an example embodiment, method 300 may be implemented by BIOS instructions 224 that are depicted in FIG. 2, and employed in computing device 200. As depicted in FIG. 3, a parameter of the system battery used to power the computing device is tested at 302. The parameter is a state or a condition of the system battery. Examples of parameters that may be tested include an expansion parameter, a battery memory parameter, an overcharged parameter, an expected life parameter, a cell imbalance parameter, a connection parameter, and other parameters. It should be appreciated that the expansion parameter defines a swelling of the system battery, for example, from temperature variations. The battery memory parameter defines a loss of maximum energy capacity caused by the repeated recharging of the system battery. The overcharged parameter defines whether the system battery is charged over the maximum energy capacity. The expected life parameter defines a measure of an estimated length of functionality of the system battery. The cell imbalance parameter defines a measure of the voltage balance of the system battery. The connected parameter defines whether the system battery is physically connected to the computing device.

After the test, an error associated with the system battery is detected at 304. An error is a deviation from a normal or acceptable parameter of the system battery. For example, the system battery may be tested for a certain parameter, such as the overcharged parameter. If the overcharged parameter from a test of the system battery defines that the system battery is charged over a predefined maximum energy capacity, then an error associated with the system battery is detected. In another example, if the connection parameter from a test defines that the system battery is not connected to the computing device, then another error associated with the system battery is detected. In an example embodiment, the error associated with the system battery is detected during the pre-boot sequence. For example, the error may be detected before an operating system is loaded onto the computing device. In another example embodiment, the error may be detected when the computing device detects a change in current supplied by the system battery. For example, as explained in more detail below, a change in current may occur when the computing device is waking from a reduced power mode and therefore, the error may be detected when the computing device is waking from the reduced power mode.

Figure 4:
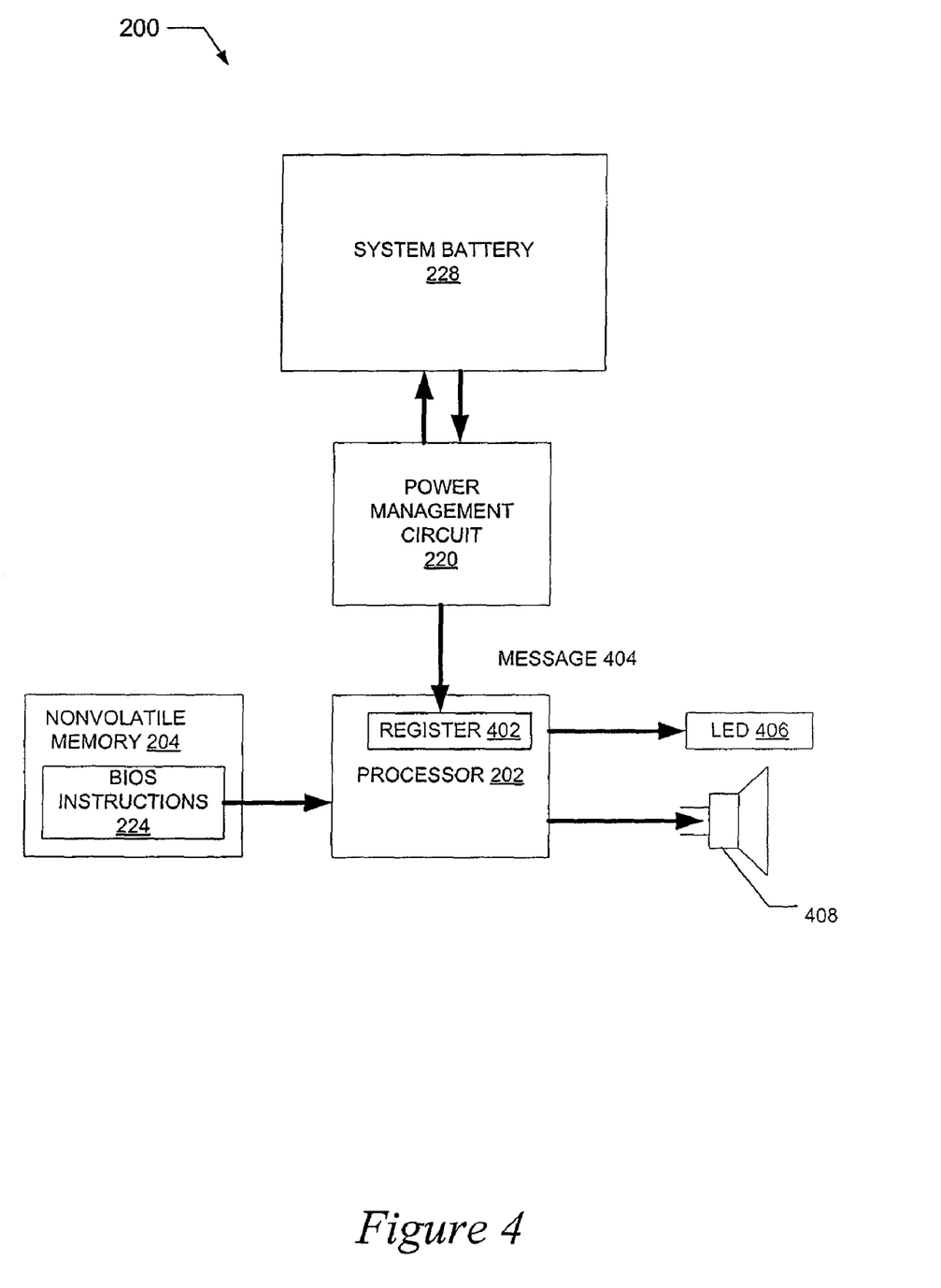
FIG. 4 depicts a more detailed diagrammatic representation of the machine in the example form of a computing device for identifying an error with system battery.

FIG. 4 depicts a more detailed diagrammatic representation of the machine in the example form of a computing device 200 for identifying an error with system battery 228. Computing device 200 includes processor 202 in communication with nonvolatile memory 204, power management circuit 220, LED 406, and speaker 408. System battery 228 is operably associated with computing device 200. During a pre-boot sequence or when computing device 200 detects a change in current from system battery 228, power management circuit 220 tests one or more parameters of the system battery. Power management circuit 220 is an integrated circuit that is configured to manage the power of computing device 200. For example, power management circuit 220 may control backlighting, hard disk spin down, power modes, charging system battery 228, and other power management operations. A System Management Controller, a System Management Unit, and a Power Management Unit are examples of power management circuit 220.

In addition to managing power, power management circuit 220 may also be configured to test system battery 228. To test system battery 228, power management circuit 220 may include sensors that sense at least one parameter of the system battery and translate the parameter into message 404. It should be appreciated that power management circuit 220 may include a variety of sensors to test (or sense) parameters of system battery 228. For example, power management circuit 220 may include an application-specific integrated circuit (ASIC) temperature sensor to sense the temperature variations of system battery 228. The temperature variations may be used, in part, to determine the expansion parameter. In another example, power management circuit 220 may include ASIC resistance, current, and/or voltage sensors that detect the resistance, current, and voltage, respectively, associated with system battery 228. Such measurements can be used to determine, for example, the cell imbalance parameter, the overcharged parameter, the connection parameter, and other parameters. It should be noted that power management circuit 220 is likely to be configured to test more than one parameter of system battery 228.

The message 404 is a value that describes the parameter. For example, message 404 may be a hexadecimal key that describes a particular parameter. In another example, message 404 may be a binary flag that describes a particular parameter. Additionally, in some examples, the message may be constructed to describe multiple parameters. Power management circuit 220 transmits message 404 to processor 202. In an example embodiment, processor 202 receives message 404 from power management circuit 220 and stores the message in register 402, which is a memory available on the processor.

During the pre-boot sequence or when computing device 200 detects a change in current from system battery 228, processor 202 loads and executes BIOS instructions 224 from nonvolatile memory 204. Processor 202 may be instructed to detect an error associated with system battery 228. In an example embodiment, processor 202 may be instructed to read message 404 from register 402 and to detect whether the message describes an error associated with system battery 228. For example, an error can be detected by comparing a value defined by message 404 with a predefined threshold. An error with system battery 228 may occur if the value exceeds or falls below the predefined threshold. In another example, an error may be detected by identifying the binary flag defined in message 404. A binary flag with a value of "1," for example, may indicate an error with system battery 228. A binary flag with a value of "0," for example, may indicate no error with system battery 228. In yet another example, message 404 may be an address that maps to various parameters of system battery 228. Certain addresses may be associated errors with system battery 228 and processor 202 may be instructed to identify these pre-defined addresses.

When processor 202 detects that message 404 describes an error associated with system battery 228, the processor can then signal the error. The processor 202 may provide a specific indication of the identified error, for example by presentation of a specific sequence or pattern lights and/or sounds. In an example embodiment, processor 202 may signal the error using a light on computing device 200, such as LED 406, incandescent light, or other light emitting devices. For example, processor 202 may blink, flash, illuminate, extinguish, pulse, or provide other visual indications to signal the error associated with system battery 228. In an example, LED 406 may blink once to indicate an error with main memory, twice to indicate an error with processor 202, and three times to indicate an error with system battery 228. The sequence of blinks may be repeated after a predefined period. In another example embodiment, processor 202 may signal the error by generating a sound through speaker 408. Similarly, for example, processor 202 may generate a series of beeps to indicate an error with system battery 228. Other sounds that may be generated to signal the error may include, for example, sounds with various tones, music, voice warning, and other sounds.

It should be appreciated that in other example embodiments, computing device 200 may include fewer or more integrated circuits (power management circuit 220, processor 202, and nonvolatile memory 204) apart from those depicted in FIG. 4. For example, power management circuit 220 may be integrated with processor 202 to form one integrated circuit. In another example, power management circuit 220, processor 202, and nonvolatile memory 204 may be combined to form one integrated circuit.

Figure 5:
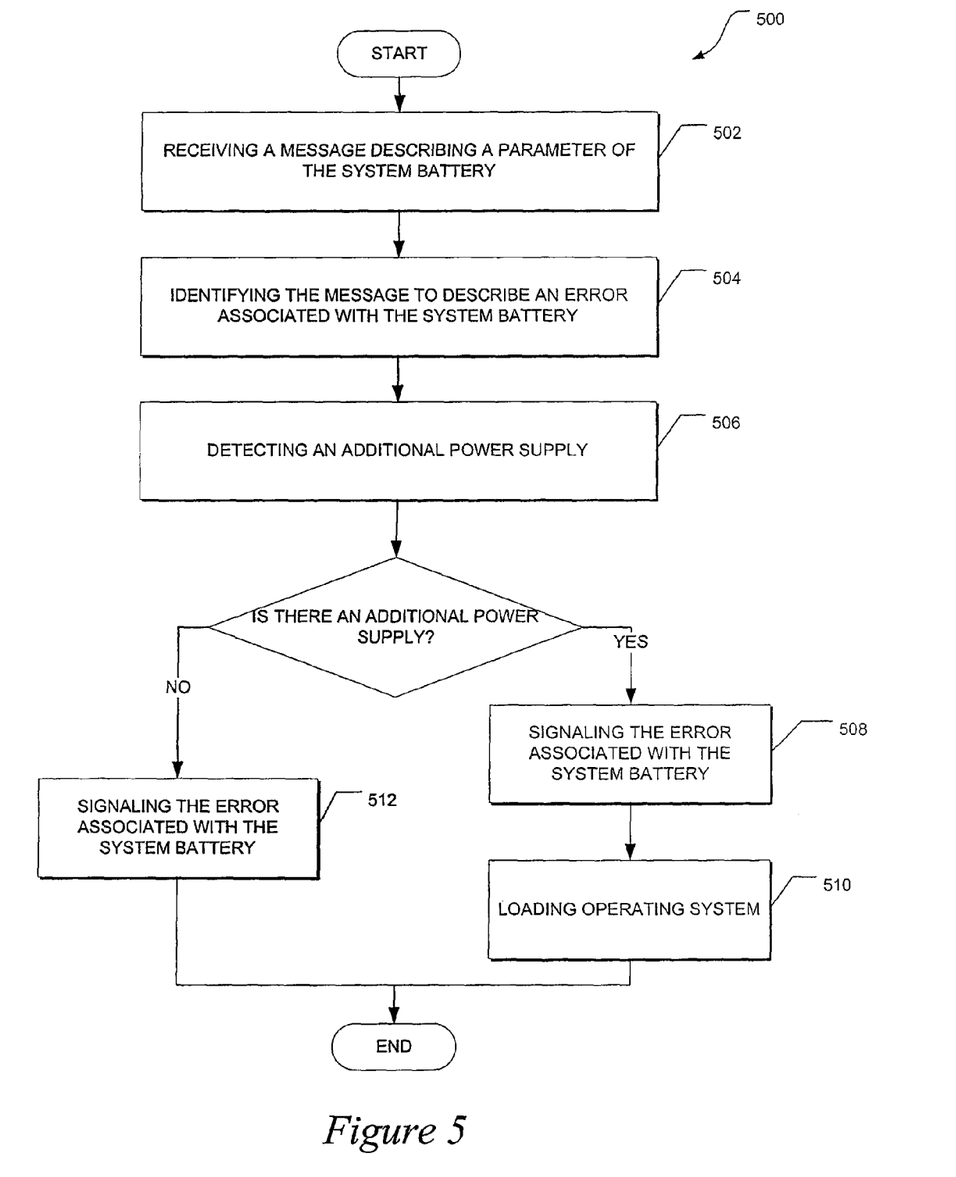
FIG. 5 depicts a flow diagram of detailed methods, in accordance with an example embodiment, for identifying an error associated with a system battery during a pre-boot sequence.

FIG. 5 depicts a flow diagram of detailed methods, in accordance with an example embodiment, for identifying an error associated with a system battery during a pre-boot sequence. In an example embodiment, method 500 may be implemented by BIOS instructions 224 that are depicted in FIG. 2, and employed in computing device 200. As depicted in FIG. 5, a message is received at 502 describing a parameter of the system battery that is used to power the computing device. The message is generated from a test of the system battery. At 504, the message is identified to describe an error associated with the system battery.

In an example embodiment, with a system battery error, another detection is made at 506 to determine whether an additional power supply is supplying power to the computing device. This additional power supply is different from the system battery. For example, the computing device may be coupled to an alternating current electrical power supply. In such an example, the alternating current electrical power supply is supplying power to the computing device, although the system battery is available to supply power in the event the alternating current supply is removed or interrupted. If an additional power supply is available, then the error associated with the system battery may be signaled at 508. Since the additional power supply is supplying power to the computing device, the computing device may continue to load operating system at 510 after the pre-boot sequence.

On the other hand, if an additional power supply is not available, then the error associated with the system battery is signaled at 512. Without an additional power supply, the computing device does not proceed to load the operating system. In an alternate example embodiment, the computing device may continue to load the operating system depending on the type of error. For example, if the error associated with the system battery is minor, such as merely being overcharged, then the computing device may continue to load the operating system. However, for example, if the error associated with the system battery is major and may cause the computing device to operate with errors, then the computing device does not proceed to load the operating system.

Figure 6:
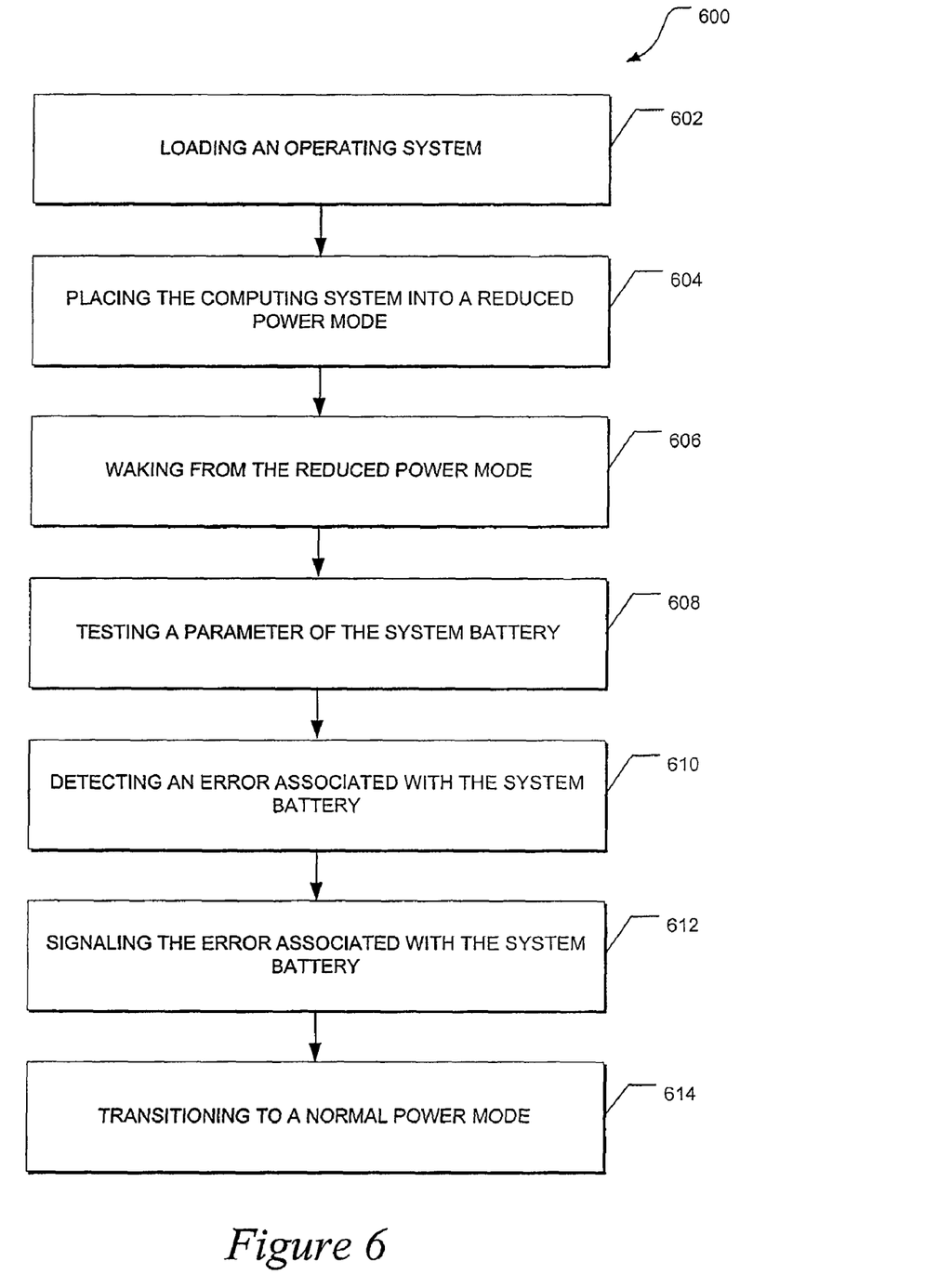
FIG. 6 depicts a flow diagram of detailed methods, in accordance with an example embodiment, for identifying an error associated with a system battery when a computing device is waking from a reduced power mode.

FIG. 6 depicts a flow diagram of detailed methods, in accordance with an example embodiment, for identifying an error associated with a system battery when a computing device is waking from a reduced power mode. In an example embodiment, method 600 may be implemented by BIOS instructions 224 that are depicted in FIG. 2, and employed in computing device 200. As depicted in FIG. 6, the computing device at 602 loads the operating system. Thereafter, the computing device is placed into a reduced power mode. It should be noted that a computing device may have a normal power mode and a reduced power mode. In a reduced power mode, the computing device uses less power than the normal power mode to save energy. For example, in a reduced power mode, a computing device my shut down unnecessary components, such as video display and drive unit. In another example, the computing device may dim the video display in a reduced power mode such that the video display uses less power. A user may place the computing device into a reduced power mode or the reduced power mode may be triggered by a period of inactivity. Examples of reduced power modes may include sleep modes, stand-by modes, hibernation modes, and other power modes configured to limit power utilized by the computing device.

The computing device may then wake from the reduced power mode at 606. When waking from the reduced power mode, the computing device transitions to the normal power mode. The user or any variety of events can cause the computing device to wake from the reduced power mode. Examples of wake events include movement of a mouse, keyboard activity, and other wake events. In an example embodiment, the process of the computing device waking from a reduced power mode can trigger the hardware of the computing device (e.g., the power management circuit) to test the system battery. For example, the computing device can be configured to conduct a self test, which includes a test of the system battery, when the power management circuit detects a change in current supplied by system battery. When the computer device is waking from a reduced power mode, the computing device draws more power from the system battery. As a result of the increased power, the current supplied by the system battery changes. The transition from the reduced power mode to the normal power mode can therefore trigger the computing device to test the system battery.

When the computing device is waking from a reduced power mode, the BIOS instructions stored on memory, such as nonvolatile memory, may instruct the power management circuit to test parameters of the system battery. At 608, the power management circuit tests the parameters of the system battery and transmits one or more messages to the processor describing the parameters. An error associated with the system battery may be detected from the parameters at 610 when the computing device is waking from the reduced power mode. For example, the error may be detected before the computing device has transitioned to the normal power mode. If an error is detected, the BIOS instructions can instruct the processor to signal the error at 612. Once awakened, the computer completes transition to the normal power mode at 614 and returns to its former operating status.

While the invention(s) is (are) described with reference to various implementations and exploitations, it will be understood that these embodiments are illustrative and that the scope of the invention(s) is not limited to them. In general, techniques for detecting system battery errors may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of identifying an error associated with a system battery that is operably associated with a computing device, the method comprising the acts of:

testing a parameter of the system battery used to power the computing device; and detecting an error associated with the system battery from the parameter before an operating system is loaded onto the computing device, wherein the parameter is one of an expansion parameter and an overcharged parameter.

2. The method of claim 1, further comprising the act of signaling the error associated with the system battery.

3. The method of claim 2, wherein the act of signaling the error includes using a light on the computing device.

4. The method of claim 2, wherein the act of signaling the error includes generating a sound.

5. The method of claim 1, further comprising the act of loading the operating system when the computing device is coupled to an additional power supply.

6. The method of claim 1, wherein the error is detected during a pre-boot sequence.

7. The method of claim 1, wherein the parameter additionally includes a battery memory parameter.

8. The method of claim 1, wherein the parameter additionally includes an expected life parameter.

9. The method of claim 1, wherein the parameter additionally includes a cell imbalance parameter.

10. The method of claim 1, wherein the parameter additionally includes a connection parameter.

11. A method of identifying an error associated with a system battery that is operably associated with a computing device having a normal power mode and a reduced power mode, the method comprising the acts of:
- testing a parameter of the system battery used to power the computing device; and
- detecting an error associated with the system battery from the parameter when the computing device is waking from the reduced power mode,
- wherein the act of testing and the act of detecting are instructed by basic input/output system (BIOS) instructions stored on a nonvolatile memory.

12. The method of claim 11, further comprising the act of signaling the error associated with the system battery.

13. The method of claim 11, wherein the error is detected before the computing device has transitioned to the normal power mode.

14. The method of claim 11, wherein the reduced power mode is a sleep mode.

15. A computing device, comprising:
- at least one processor;
- a power management circuit in communication with the at least one processor, the power management circuit being configured to test a parameter of a system battery used to power the computing device and configured to transmit a message describing the parameter to the at least one processor; and
- a memory in communication with the at least one processor, the memory being configured to store basic input/output system (BIOS) instructions executable by the at least one processor, and the BIOS instructions are executed by the at least one processor cause the operations to be performed, comprising:
  - receiving the message;
  - identifying the message to describe an error associated with the system battery; and
  - signaling the error when the computing device is waking from a reduced power mode.

16. The computing device of claim 15, wherein the system battery forms a part of the computing device.

17. The computing device of claim 15, wherein the operations further comprise signaling the error during a pre-boot sequence.

18. The computing device of claim 17, further comprising a light-emitting diode (LED) coupled to the at least one processor, and wherein the operation of signaling the error is performed at least in part by blinking the LED.

19. The computing device of claim 17, further comprising a speaker coupled to the at least one processor, and wherein the operation of signaling the error is performed at least in part by generating a sound through the speaker.

20. The computing device of claim 15, wherein the memory is a nonvolatile memory.

21. The computing device of claim 15, wherein the at least one processor includes a register and the message is stored in the register.

22. The computing device of claim 15, further comprising a clock circuit in communication with the at least one processor and coupled to a clock battery used to power the clock circuit, the system battery being distinct from the clock battery.

23. A machine-readable storage medium that stores instructions, which when performed by a computing device having a normal power mode and a reduced power mode, cause the computing device to perform operations comprising:
- testing a parameter of a system battery used to power the computing device that is operably associated with the computing device;
- detecting an error associated with the system battery from the parameter when the computing device is waking from the reduced power mode; and
- signaling the error associated with the system battery.

24. The machine-readable storage medium of claim 23, wherein the instructions, when performed by the computing device, cause the computing device to perform operations further comprising:
- detecting that power is supplied to the computing device by an additional power supply; and
- loading the operating system when power is supplied to the computing device by the additional power supply.

25. An apparatus comprising:
- a set of one or more processors operable to execute a set of one or more embedded applications that identify an error associated with a system battery that is operably associated with the apparatus;
- a power management circuit for testing a parameter of the system battery used to power the computing device; and
- a detection means for detecting an error associated with the system battery from the parameter before an operating system is loaded onto the computing device,
- wherein the parameter is one of an expansion parameter and an overcharged parameter.

26. The apparatus of claim 25, wherein the parameter additionally includes a battery memory parameter.

27. The apparatus of claim 25, wherein the parameter additionally includes an expected life parameter.

28. The apparatus of claim 25, wherein the parameter additionally includes a cell imbalance parameter.

29. The apparatus of claim 25, wherein the parameter additionally includes a connection parameter.

* * * * *

UNITED STATES PATENT AND TRADEMARK OFFICE
CERTIFICATE OF CORRECTION

PATENT NO. : 7,877,631 B2  Page 1 of 1
APPLICATION NO. : 11/969725
DATED : January 25, 2011
INVENTOR(S) : Darren Eastman It is certified that error appears in the above-identified patent and that said Letters Patent is hereby corrected as shown below:

On the first page, in field (56), in column 2, under "Other Publications", line 4-5, delete "Commumnication" and insert -- Communication --, therefor.

Signed and Sealed this
Eighth Day of November, 2011

David J. Kappos
*Director of the United States Patent and Trademark Office*